No. 789,780. PATENTED MAY 16, 1905.
C. O. WYMAN.
VEHICLE RUNNING GEAR.
APPLICATION FILED SEPT. 28, 1903. RENEWED AUG. 29, 1904.

3 SHEETS—SHEET 1.

WITNESSES
INVENTOR
CHARLES O. WYMAN
BY
HIS ATTORNEYS.

No. 789,780. PATENTED MAY 16, 1905.
C. O. WYMAN.
VEHICLE RUNNING GEAR.
APPLICATION FILED SEPT. 28, 1903. RENEWED AUG. 29, 1904.

3 SHEETS—SHEET 2.

WITNESSES
INVENTOR
CHARLES O. WYMAN
BY
HIS ATTORNEYS

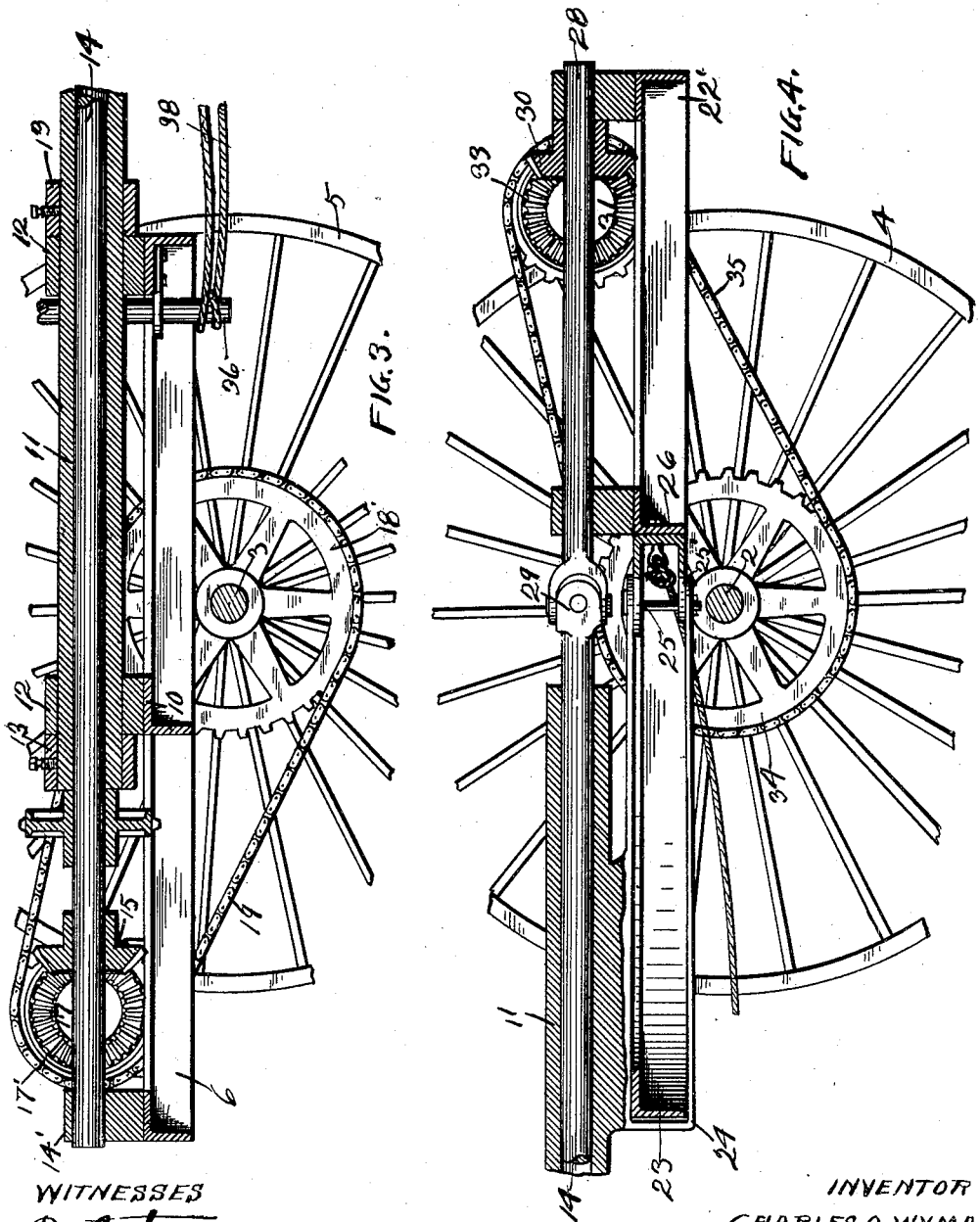

No. 789,780.

Patented May 16, 1905.

UNITED STATES PATENT OFFICE.

CHARLES O. WYMAN, OF ANOKA, MINNESOTA.

VEHICLE RUNNING-GEAR.

SPECIFICATION forming part of Letters Patent No. 789,780, dated May 16, 1905.

Application filed September 28, 1903. Renewed August 29, 1904. Serial No. 222,608.

*To all whom it may concern:*

Be it known that I, CHARLES O. WYMAN, of Anoka, county of Anoka, State of Minnesota, have invented certain new and useful Improvements in Vehicle Running-Gears, of which the following is a specification.

My invention relates, in general, to running-gears, and particularly to that class wherein the source of power is carried by the frame of the vehicle, as in an automobile.

The object of my invention is to provide a running-gear of the above type wherein the driving force is applied to both axles and all four wheels and is uniformly distributed between them, to the end that all inequalities or strains will be avoided and the vehicle will be more efficient, particularly on unpaved streets or rough country roads.

Other objects of the invention will appear from the following detailed description.

The invention consists generally in a wheeled frame, a driving-shaft longitudinally arranged thereon and having operative connections with the front and rear axles, and a universal joint interposed between said driving-shaft and the front axle.

Further, the invention consists in a hollow reach connecting the forward and rear axles and inclosing said driving-shaft.

Further, the invention consists in pivotally connecting said reach to the forward axle and providing a connection between the rear end of the reach and the rear axle that will permit the reach to roll or rock in its bearings and adjust itself to the inequalities of the ground over which the vehicle may be passing.

Further, the invention consists in various constructions and combinations, all as hereinafter described, and particularly pointed out in the claims.

Figure 1:
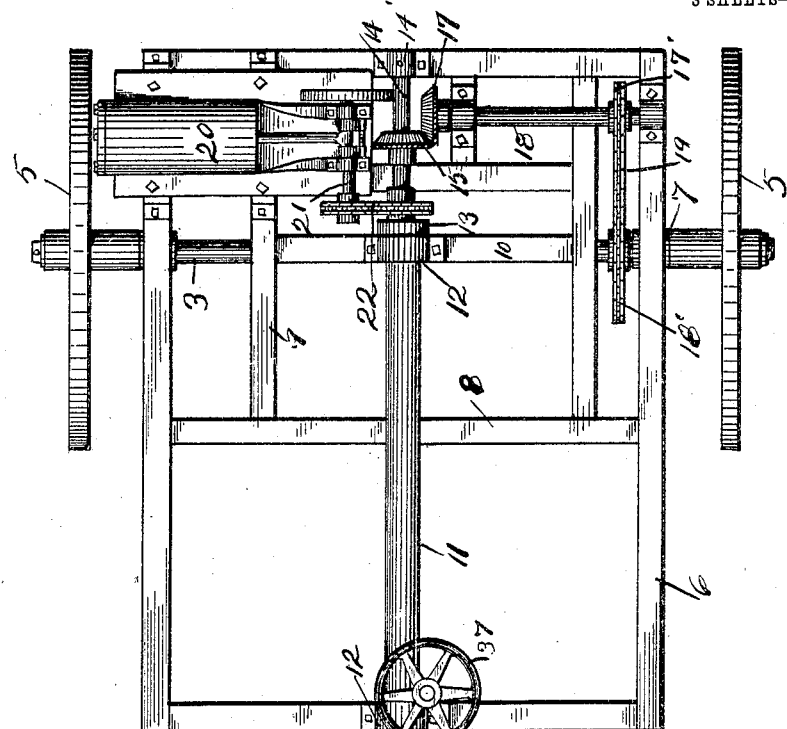
Figure 1:
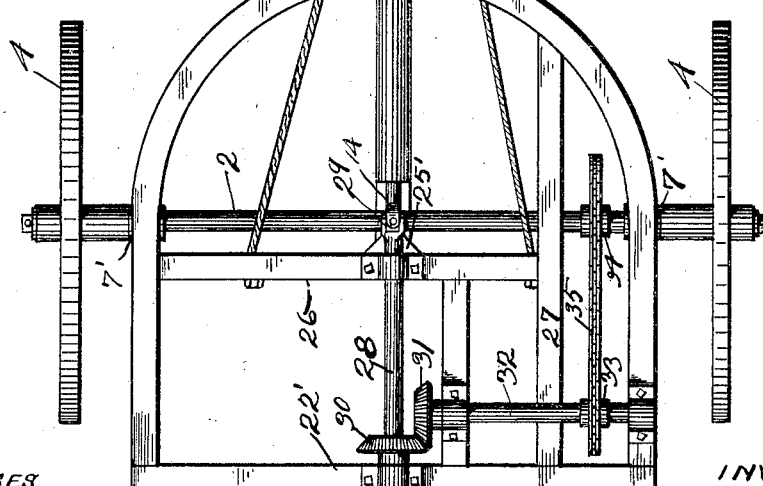
Figure 2:
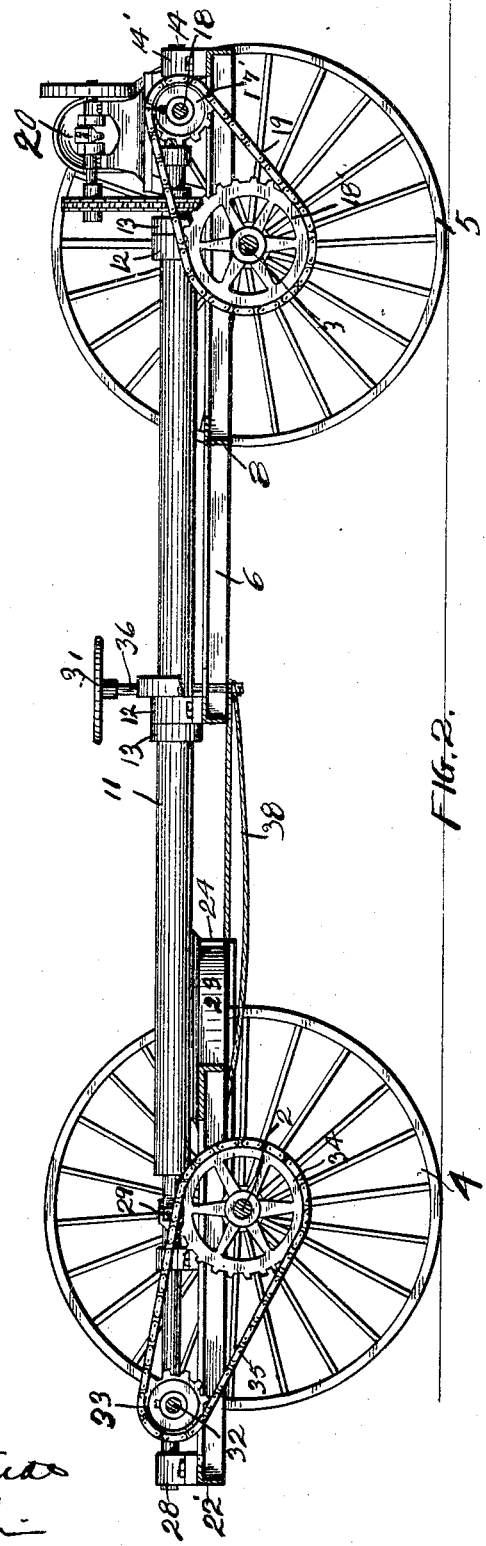

In the accompanying drawings, forming part of this specification, Figure 1 is a plan view of a vehicle running-gear embodying my invention. Fig. 2 is a longitudinal sectional view of the same. Fig. 3 is a longitudinal sectional view of the rear end of the running-gear, and Fig. 4 is a corresponding view of the forward end.

In the drawings, 2 and 3 represent, respectively, the forward and rear axles, provided with supporting-wheels 4 4 and 5 5.

6 is a rectangular frame, preferably of angle-iron on account of its great strength and rigidity in proportion to its weight, mounted in boxes 7 on the rear axle and having a series of strengthening cross bars or braces 8, 9, and 10, the latter connecting the braces 9 above the rear axle, as shown in Fig. 1.

11 is a hollow reach mounted in bearings 12 on the frame 6 and held against longitudinal movement by collars 13, but free to turn or rock in said bearings and adjust itself to the different inclinations of the axles in passing over rough roads. A main driving-shaft 14 is arranged longitudinally in a bearing 14' on said frame and extends through said hollow reach and is provided near its rear end with a beveled gear 15, meshing with a similar gear 17 on a counter-shaft 18, that is connected with the rear axle by sprocket-wheels 17' and 18' and a driving-chain 19. An engine 20, preferably of the gasolene type, is mounted on the frame 6 and has its shaft 21 connected by a chain 22 with the driving-shaft 14 to operate said shaft and running-gear. A frame 22', also preferably composed of angle-iron, is rigidly mounted in boxes 7' on the forward axle and provided with a curved rear portion 23. The frame 22 is provided with brace-rods 26 and 27, and a secondary shaft 28 is mounted on the said frame and the bar 26 in line with the main driving-shaft 14 and is connected thereto by a universal joint 29. Gears 30 and 31 connect the shaft 28 with a shaft 32, that has a driving connection through sprockets 33 and 34 and a chain 35 with the forward axle. A clevis 24 is provided at the forward end of the reach, embracing the curved part 23 and pivotally connected by the king-bolt 25 to a clip 25', that is secured to the cross-bar 26. The curved part 23 slides freely in the clevis as the forward axle is swung back and forth in guiding the vehicle. A steering-post 36 is mounted on the frame 6 and provided with an operating-wheel 37 and connected with the brace-bar 26 on the frame 22 by steering ropes or cables 38, said wheel being operated in the usual manner to oscillate the forward axle and steer the vehicle. With this means of connecting both the front and rear axles of the vehicle with the source of power I am able to evenly distribute the motive force to both axles, avoid all inequalities of strains, and render the vehicle much more efficient, particularly where it is used on rough unpaved streets or country roads. The power is applied simultaneously to all four wheels, the universal-joint connection at the forward end of the driving-shaft allowing the forward axle to be turned in either direction to guide the vehicle without in any way affecting the transmission of power. The hollow reach conceals the driving-shaft, simplifies the framework, and presents a neat and compact appearance and renders the running-gear particularly adapted for use with automobiles.

The manner of applying power from the engine to the driving-shaft and from the shaft to the axles may be modified in various ways, and the construction of the front and rear frames may also be changed without departing from the spirit of my invention, which resides particularly in the connection of a driving-shaft with all four wheels of the vehicle and the interposition of a single universal joint between the forward axle and its wheels and said driving-shaft to permit said forward axle to be oscillated in either direction for the purpose of guiding the vehicle, and I claim also the hollow reach connection between the front and rear axles.

I claim as my invention—

1. In a vehicle running-gear, a hollow reach and a shaft therein having operative connections with the front and rear axles, in combination with a universal joint interposed in said connections between said shaft and the front axle.

2. A vehicle running-gear, comprising front and rear axles and carrying-wheels, in combination with a hollow reach connecting said axles, a pivotal connection being provided between the forward end of said reach and the forward axle, and a driving-shaft arranged within said reach and having operative connections with the front and rear axles, substantially as described.

3. A vehicle running-gear, comprising front and rear axles and wheels therefor, in combination with a reach connecting said axles, the forward end of said reach being pivotally connected with the corresponding axle, a driving-shaft having operative connections with the front axle and a universal joint interposed between said driving-shaft and said axle, the pivot of said joint being coincident substantially with the pivot of said reach.

4. A vehicle running-gear, comprising front and rear axles and wheels therefor, a hollow reach having its forward end pivotally connected to the forward axle, a driving-shaft arranged within said reach and having operative connections with the front axle, a universal joint interposed between said joint and the forward axle, the pivot of said joint being coincident substantially with the pivot of said reach, substantially as described.

5. A vehicle running-gear comprising front and rear axles and their wheels, frames mounted on said axles, a hollow reach having a clevis at its forward end and pivotally connected with said forward-axle frame, a driving-shaft within said reach, and having operative connection with the front and rear axles, and a universal joint interposed between said shaft and the forward axle.

6. A vehicle running-gear, comprising a wheeled frame, a source of motive power thereon, a longitudinally-arranged driving-shaft having operative connections with the front and rear axles, a hollow reach inclosing said shaft, and a universal joint interposed between said shaft and said front axle.

7. A vehicle running-gear, comprising a wheeled frame, a source of motive power thereon, a longitudinally-arranged driving-shaft having operative connections with the front and rear axles, a hollow reach connected with the front axle and having bearings on the rear axle that permit said reach to rock or roll therein.

8. A vehicle running-gear, comprising forward and rear axles and their wheels, an engine supported on said rear axle, a main driving-shaft having its rear end operatively connected with said engine and the rear axle, a secondary shaft in advance of said main shaft and in line therewith and having operative connections with the front axle, and a universal-joint connection interposed between said main and secondary shafts.

9. A vehicle running-gear, comprising the front and rear axles and their wheels, a gasolene-engine supported on the rear axle, a hollow reach connecting said axles, a driving-shaft within said reach having operative connections with said engine and the front and rear axles, and a universal joint interposed in said forward axle connections.

10. A vehicle running-gear, comprising forward and rear axles and their wheels, a main driving-shaft operatively connected with the rear axle, a secondary shaft having operative connections with the front axle, and a universal-joint connection interposed between said main and secondary shafts.

11. In a vehicle running-gear, in combination with the front and rear axles and their wheels, a hollow reach, a shaft therein operatively connected with the rear axle, and a driving connection interposed between said shaft and the forward wheels.

12. In a running-gear in combination with the front and rear axles and their wheels, a hollow reach, a shaft therein, a source of motive power connected with said shaft, and a driving connection provided between the forward end of said shaft and said forward wheels.

In witness whereof I have hereunto set my hand this 25th day of September, 1903.

CHARLES O. WYMAN.

In presence of—
 RICHARD PAUL,
 S. V. GRIFFIN.